J. R. TREADWELL.
OVEN.
No. 95,750. Patented Oct. 12, 1869.
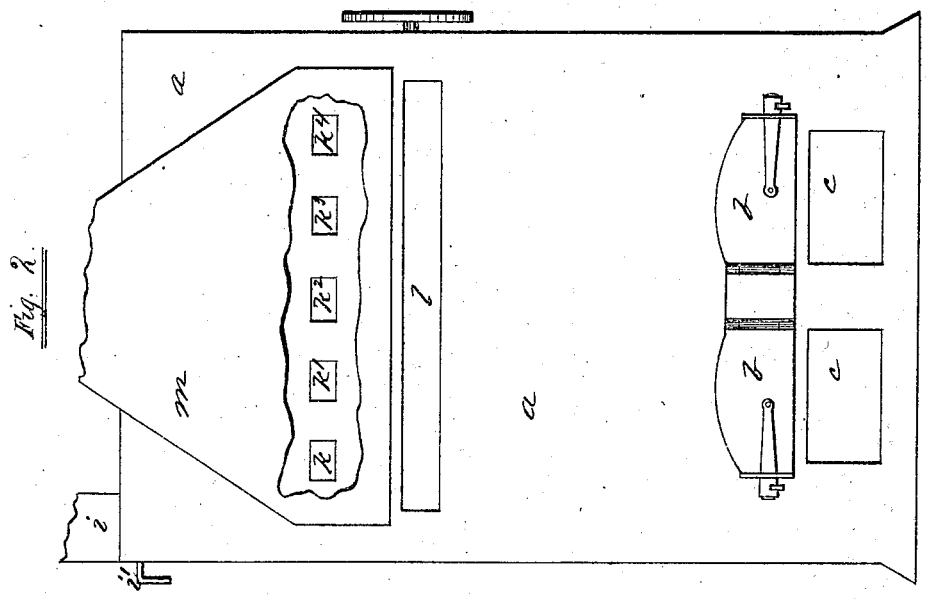
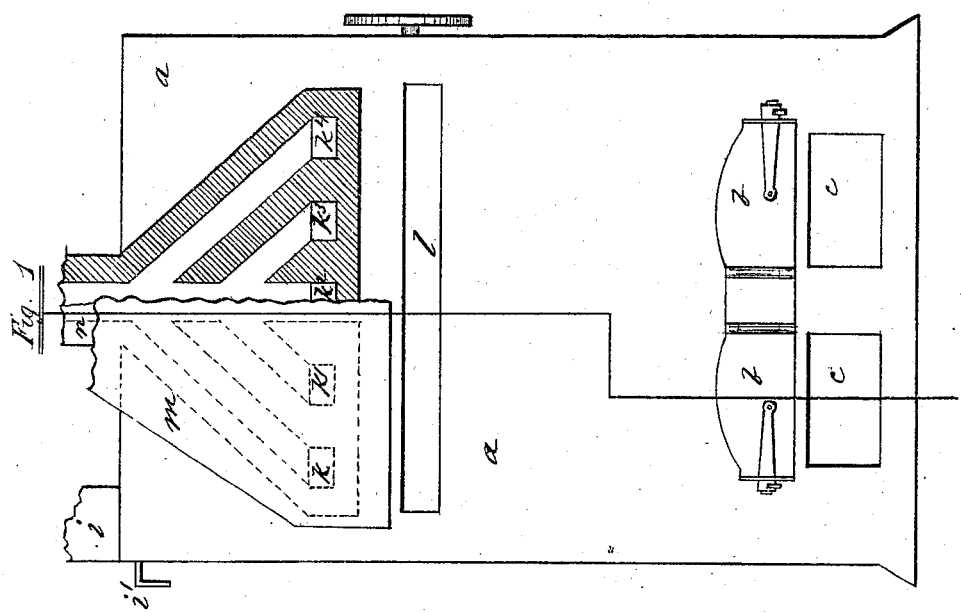
Witnesses
Alonzo Hunt
Alex Ehrenater
Inventor
John R. Treadwell

United States Patent Office.

JOHN R. TREADWELL, OF BROOKLYN, NEW YORK.

Letters Patent No. 95,750, dated October 12, 1869.

OVEN.

The Schedule referred to in these Letters Patent and making part of the same.

*To all whom it may concern:*

Be it known that I, JOHN R. TREADWELL, of the city of Brooklyn, county of Kings, in the State of New York, have invented a certain new and useful Improvement in Bakers' "Reel-Ovens;" and I do hereby declare that the following is a full and correct description thereof, reference being had to the accompanying drawings, and to the letters of reference thereon.

My invention relates to that class of bakers' ovens commonly known as reel-ovens, in which the bread or biscuit is placed upon pans suspended from the bars of a horizontal reel, within an oven or chamber heated by products of combustion admitted therein from a furnace or furnaces beneath, the reel being rotated to carry the pans to and from the mouth of the oven to be charged and discharged.

Heretofore, in such ovens, the steam escaping from the bread or crackers baking in the oven, has either passed out of the mouth of the oven, or through a flue in the mouth, as in ovens that bake upon the floor, or it has been drawn off by the flue in the top of the oven used in heating.

When the steam is drawn off through the mouth, it is impossible to bake crackers dry, as they should be and are baked in common ovens, because the pans above the oven-mouth containing crackers partially baked are enveloped in the steam with which the oven is filled above the mouth at the time when the crackers should be drying out.

When the steam is drawn off by the flue in the top of the oven, the appearance of the face of the cracker is spoiled, in consequence of not being shielded by steam from the direct heat reflected from the brick arch, forming the oven-top immediately above them.

The object of my invention is to remedy this defect, and produce as good baking in a reel-oven as in the common oven, and this I have effected by combining, with the oven, steam-flues, to regulate the steam-level in the oven, at a point sufficiently above the mouth of the oven to have the crackers well dried upon the pans before they descend to the mouth, to be discharged, and sufficiently below the oven-top to shield the face of the crackers from the dry heat of the bricks when near the arch.

I prefer to put in my steam-flues in front, just under the skew-back of the arch, as shown in the drawings, but they may be placed a little higher or lower, and produce a good result, the object being to regulate the level of the steam in the oven, while baking, at a point sufficiently high to insure the proper drying out of the crackers, and yet low enough to retain a proper quantity of steam in the oven to shield the face of the crackers when near the top of the oven.

The heated gases from the coal are also kept at the steam-level, and pass out with the steam through the steam-flues above the mouth, thus preventing the steam and gases from discharging through the mouth, to the great injury, and inconvenience, and injury of health of the ovensmen and others in the bakehouse.

The steam-flues may pass directly through the front wall, and discharge into the bake-house, or under a bonnet over the oven-mouth, but I prefer to gather them into a stack underneath the bonnet, and regulate them by a damper, as hereinafter described.

The accompanying drawings represent a well-known form of "reel-oven," as constructed with my improvement.

Figure 1 is a front elevation of the oven, with the bonnet and part of the steam-flue stacks broken away, showing the steam-flues.

Figure 2, another front elevation, with the bonnet broken away, showing the steam-flues carried through the front wall, and discharging within the bonnet.

Figure 3, a vertical cross-section, showing the rear part of the oven.

Figure 4, a vertical longitudinal section, showing furnaces, oven, reel, steam-flues, with their covering, and also the bonnet.

Letter *a* represents the brick-work of the oven.
*b*, the furnace.
*c*, the ash-pit.
*d*, the smoke-flue, controlled by a damper, *d'*, used when kindling the fire.
*e*, openings from the furnace into the oven.
*f*, the oven.
*g*, the reel.
*h*, the pans, suspended from the reel.
*i*, the draught-flue in the top of the oven, controlled by the damper *i'*, and used for heating up the oven, but closed when the oven is heated.

This top flue *i* may be omitted in ovens constructed with my improvement.

Letters $k$, $k^1$, $k^2$, $k^3$, $k^4$, represent a series of steam-flues, which I prefer to place in the front wall, just below the skew-back of the oven-arch, as shown in fig. 4.

They may, however, be put in the rear wall or side walls, at a corresponding elevation above the oven-mouth *l*, or at a point a little higher or lower, as before mentioned.

They may discharge the steam within the bonnet *m*, as shown in fig. 2, or preferably be gathered into a chimney-stack, covered with a covering, *n*, in front of the oven-wall, and controlled by a damper, *p*, as shown in fig. 4.

The pans, when filled with crackers, pass downward from the mouth toward the furnaces, and, by the rotation of the reel, are carried thence to the upper part of the oven before reaching the oven-mouth to be discharged, making a circuit of the oven while baking the crackers.

My invention is of great importance, as these ovens are capable of baking from fifty to one hundred barrels of flour in crackers per day, and, by reason of their economy in heating and working, would be the best oven for baking crackers, were it not, that as heretofore constructed, crackers baked in them were inferior to those baked upon floor-ovens, owing, as I have discovered, to want of proper means of regulating the level of the steam escaping from the crackers within the oven.

I claim as my invention and improvement in bakers' "reel-ovens"—

In combination with the "reel-oven," a steam-flue or series of steam-flues, when arranged above the mouth and below the top, substantially as described, whereby a proper steam-level is maintained to protect the face of the crackers when carried to the upper part of the oven, and the steam prevented from accumulating below said level, to interfere with drying out the crackers properly, substantially as described.

JOHN R. TREADWELL.

Witnesses:
ALONZO P. HUNT,
ALEX. CRUMBIE.